United States Patent
Collins et al.

(10) Patent No.: US 9,146,906 B1
(45) Date of Patent: Sep. 29, 2015

(54) MODIFYING A WEBPAGE DISPLAY BASED ON A REFERRER WEB ADDRESS

(75) Inventors: Alexander Collins, San Francisco, CA (US); Jeffrey L. Korn, New York, NY (US)

(73) Assignee: Google Inc., Mountain View, CA (US)

( * ) Notice: Subject to any disclaimer, the term of this patent is extended or adjusted under 35 U.S.C. 154(b) by 587 days.

(21) Appl. No.: 13/527,516

(22) Filed: Jun. 19, 2012

(51) Int. Cl.
*G06F 17/00* (2006.01)
*G06F 17/21* (2006.01)

(52) U.S. Cl.
CPC .................................. *G06F 17/211* (2013.01)

(58) Field of Classification Search
CPC .. G06F 17/211; G06F 17/241; G06F 17/3089
USPC .......................... 715/234, 241, 200, 230, 232
See application file for complete search history.

(56) References Cited

U.S. PATENT DOCUMENTS

| | | | |
|---|---|---|---|
| 2008/0091547 A1* | 4/2008 | Baker | 705/26 |
| 2009/0265607 A1* | 10/2009 | Raz et al. | 715/233 |
| 2009/0327863 A1* | 12/2009 | Holt et al. | 715/234 |
| 2011/0040787 A1* | 2/2011 | Cierniak et al. | 707/770 |
| 2012/0158753 A1* | 6/2012 | He et al. | 707/752 |
| 2012/0159635 A1* | 6/2012 | He et al. | 726/26 |
| 2013/0091419 A1* | 4/2013 | Caliman et al. | 715/236 |
| 2013/0204833 A1* | 8/2013 | Pang et al. | 706/52 |
| 2013/0268525 A1* | 10/2013 | Kanai et al. | 707/723 |

* cited by examiner

*Primary Examiner* — Stephen S. Hong
*Assistant Examiner* — Gregory J Vaughn
(74) *Attorney, Agent, or Firm* — McDermott Will & Emery LLP

(57) ABSTRACT

Systems and methods for modifying a webpage display based on a referrer web address are provided. In some aspects, a method includes receiving a request for a webpage. The request includes one or more referrer web addresses. The webpage includes multiple comments. The method also includes modifying a representation of an output for the webpage based on the one or more referrer web addresses. Modifying the representation of the output for the webpage includes arranging at least a subset of the multiple comments according to an order based on the one or more referrer web addresses. The method also includes providing the modified representation of the output for the webpage for generating a display on a client computing device.

20 Claims, 3 Drawing Sheets

MODIFYING A WEBPAGE DISPLAY BASED ON A REFERRER WEB ADDRESS

BACKGROUND

Many webpages include multiple different content items, for example a primary article or video presented in conjunction with comments or advertisements. Some webpages may include many (e.g., hundreds or thousands) of comments, each of which may be interesting to different types of users. A specific user viewing the webpage may spend time to find the comments that are interesting to him/her or avoid discovering the interesting comments to save time. As the foregoing illustrates, an approach for providing, to the specific user, comments that are of interest to the specific user may be desirable.

SUMMARY

The subject technology generally relates to web interfaces and, in particular, relates to modifying a webpage display based on a referrer web address.

The disclosed subject matter relates to a computer-implemented method. The method includes receiving a request for a webpage. The request includes one or more referrer web addresses. The webpage includes multiple comments. The method also includes modifying a representation of an output for the webpage based on the one or more referrer web addresses. Modifying the representation of the output for the webpage includes arranging at least a subset of the multiple comments according to an order based on the one or more referrer web addresses. The method also includes providing the modified representation of the output for the webpage for generating a display on a client computing device.

These and other embodiments can include one or more of the following features. The order is further based on one or more second referrer web addresses for one or more users who previously interacted with the multiple comments. Modifying the representation of the output for the webpage includes determining an advertisement to present within the webpage based on the one or more referrer web addresses. Modifying the representation of the output for the webpage includes providing a display element, based on the one or more referrer web addresses, within the modified representation of the output for the webpage. The one or more referrer web addresses include only a single referrer web address. The one or more referrer web addresses include multiple referrer web addresses. The request includes at least one cookie, and the method also includes determining the one or more referrer web addresses based on the at least one cookie. The request includes no cookies.

The disclosed subject matter further relates to a computer-readable medium. The computer-readable medium includes instructions that, when executed by a one or more computers, cause the one or more computers to implement a method. The instructions include code for receiving a request for a webpage. The request is associated with one or more referrer sources. The webpage includes multiple comments The instructions also include code for modifying a representation of an output for the webpage based on the one or more referrer sources by arranging at least a subset of the multiple comments according to an order based on the one or more referrer sources. The instructions also include code for providing the modified representation of the output for the webpage, for generating a display on a client computing device.

These and other embodiments can include one or more of the following features. The one or more referrer sources include an electronic message. The one or more referrer sources include an application different from a web browser. The one or more referrer sources include one or more referrer web addresses. The order is further based on one or more second referrer sources for one or more users who previously interacted with the multiple comments. The instructions to modify the representation of the output for the webpage include code for determining an advertisement to present within the webpage based on the one or more referrer sources. The instructions to modify the representation of the output for the webpage include code for providing a display element, based on the one or more referrer sources, within the modified representation of the output for the webpage. The one or more referrer sources include only a single referrer source. The request includes at least one cookie, and the instructions include code to determine the one or more referrer web addresses based on the at least one cookie. The request includes no cookies.

The disclosed subject matter further relates to a system. The system includes one or more processors. The system also includes a memory. The memory includes instructions which, when executed by the one or more processors, cause the one or more processors to implement a method. The instructions include code for receiving, from a client computing device, a hypertext transfer protocol (HTTP) request including an address of a requested webpage and an HTTP referrer. The requested webpage includes multiple comments. The instructions also include code for modifying a representation of an output for the requested webpage based on the HTTP referrer by arranging at least a subset of the multiple comments according to an order based on the HTTP referrer. The instructions also include code for providing, to the client computing device, the modified representation of the output for the requested webpage for generating a display on the client computing device.

These and other embodiments can include one or more of the following features. The HTTP referrer identifies one or more webpages previously displayed on the client computing device.

Advantageously, in some implementations of the subject technology, a web server may be able to provide, to a user of a client computing device, a customized webpage output for the user based on information about the user (the referrer web address). However, the web server may not collect other information about the user (e.g., information stored in cookies). The web server may not need to receive any information that is not provided by the standard HTTP protocol. As a result, the data that is provided to and processed by the web server may be decreased.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several aspects of the disclosed subject matter are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, structures and components are shown in block diagram form in order to avoid obscuring the concepts of the subject technology.

In one example, both a politics blog and an economics blog may link to a webpage including a certain article. The article may include comments by political scientists, which are likely of more interest to a user linking to the article from the politics blog, and comments by economists, which are likely of more interest to users linking to the article from the economics blog. In such circumstances, ranking the comments based on a referrer web address (of the politics blog or the economics blog) may be desirable and may allow a specific user of a webpage to view comments that are of interest to him/her.

The subject technology is related to modifying a webpage display based on a referrer web address. As used herein, the phrase "referrer web address" may include or refer to a web address from which a user selected a link to view a webpage that is displayed via the user's web browser. An example data structure representing a referrer web address is a hypertext transfer protocol (HTTP) referrer. An HTTP referrer may include one or more referrer web addresses. A web server receives, from a client computing device, an HTTP request including an address of a requested webpage and an HTTP referrer. The web server modifies a representation of an output for the requested webpage (e.g., a data stream for the requested webpage stored on the web server) based on the HTTP referrer. The web server provides, to the client computing device, the modified representation of the output of the requested webpage for generating a display on the client computing device.

Figure 1:
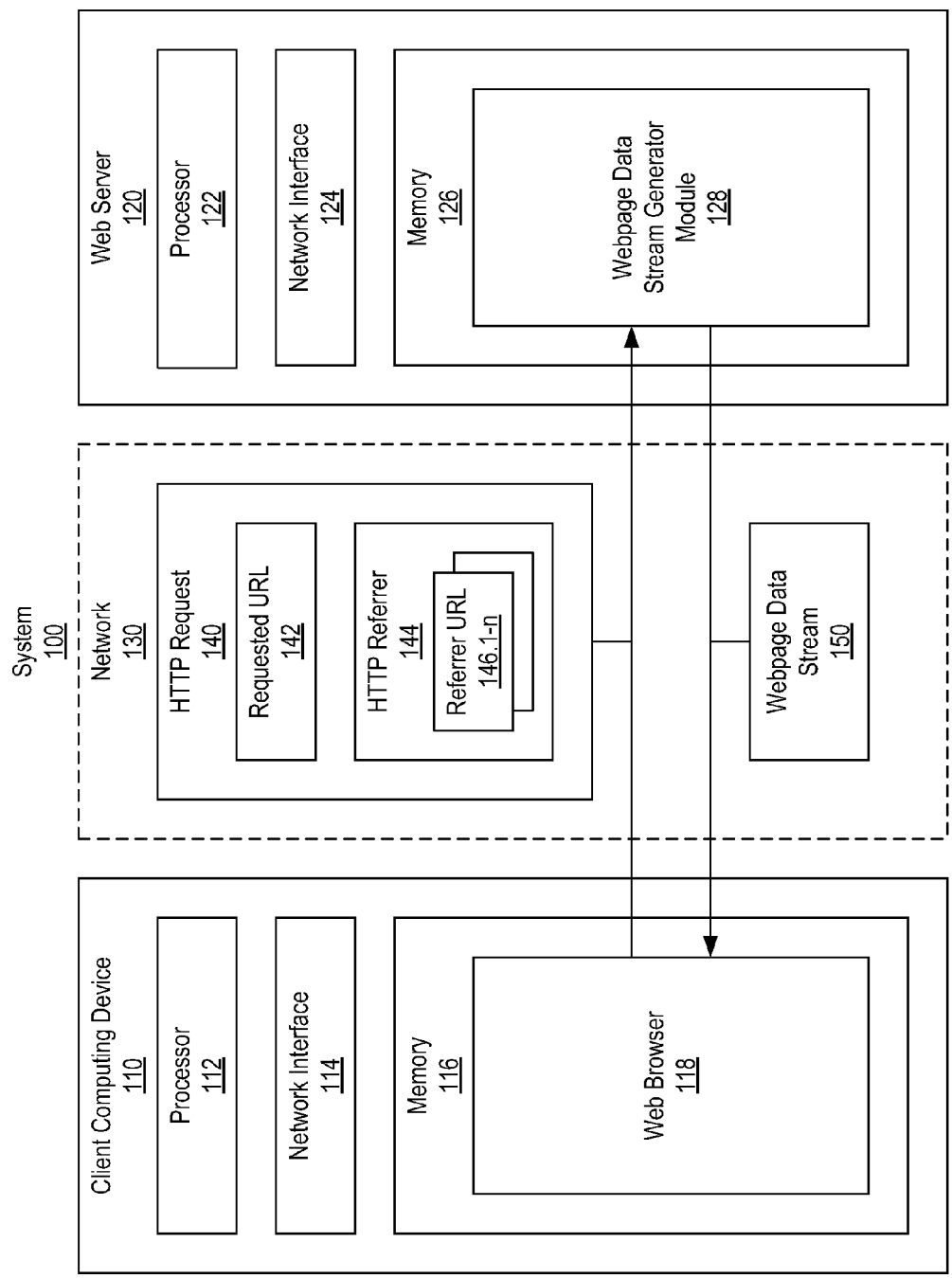
FIG. 1 illustrates an example system configured to modify a webpage display based on a referrer web address.

FIG. 1 illustrates an example system 100 configured to modify a webpage display based on a referrer web address.

As shown, the system 100 includes a client computing device 110 and a web server 120. The client computing device 110 and the web server 120 may be configured to communicate with one another via a network 140. The network 140 may include the Internet, an intranet, a local area network, a wide area network, a wired network, a wireless network, or a virtual private network (VPN). While only a single client computing device 110 and a single web server 120 are illustrated in FIG. 1, the subject technology may be implemented in conjunction with one or more client computing devices 110 or one or more web servers 120.

The client computing device 110 may be a laptop computer, a desktop computer, a mobile phone, a personal digital assistant (PDA), a tablet computer, a netbook, a television with one or more processors embedded therein or coupled thereto, a physical machine, or a virtual machine. The client computing device 110 may include or be coupled with one or more of a keyboard, a mouse, a display, or a touch screen.

As shown, the client computing device 110 includes a processor 112, a network interface 114, and a memory 116. The processor 112 is configured to execute computer instructions that are stored in a computer-readable medium, for example, the memory 116. The processor 112 may be a central processing unit (CPU). While only one processor 112 is illustrated, the client computing device 110 may include multiple processors. The network interface 114 is configured to allow the client computing device 110 to transmit and receive data in a network, e.g., network 130 of FIG. 1. The network interface 114 may include one or more network interface cards (NICs). The memory 116 stores data or instructions. The memory 116 may be one or more of a cache unit, a storage unit, an internal memory unit, or an external memory unit. As illustrated, the memory 116 includes a web browser 118.

The web browser 118 is configured to implement typical functions of a web browser. Among other things, the web browser 118 is configured to receive a representation of an output for a webpage (e.g., a webpage data stream) and to generate a display on the client computing device (e.g., in the window of the web browser) based on the received representation of the output for the webpage. The web browser is also configured to allow a user of the client computing device 110 to interact with a displayed webpage. For example, the user may select a link on the webpage.

As illustrated in FIG. 1, the web browser 118 transmits a hypertext transfer protocol (HTTP) request 140 to the web server 120 via the network 130. The HTTP request 140 includes a requested uniform resource locator (URL) 142 and an HTTP referrer 144. The HTTP referrer 144 includes one or more referrer URLs 146.1-$n$. The HTTP referrer 144 may include only one referrer URL 146 indicating a webpage previously displayed via the web browser 118 of the client computing device 110 from which the user of the client computing device 110 linked to another webpage, for example, a webpage that is currently being displayed or for which a data stream is being provided by the web server 120. Alternatively, the HTTP referrer 144 may include multiple referrer URLs 146 indicating multiple webpages previously displayed on the client computing device 110 from which the user of the client computing device 110 linked to other webpages.

The referrer URLs 146.1-$n$ may represent a linking path taken by the user of the client computing device. For example, a user of the client computing device 110 may have started a web browsing session on the web browser 118 with a search for the phrase "XYZ newspaper" on search engine ABCD-.com. The search results may been displayed at the URL: ABCD.com/XYZ+newspaper. From the search results, the user may have selected a hyperlink to view the homepage of XYZ newspaper: XYZ+newspaper.com. From the homepage of the newspaper, the user may have selected a hyperlink of an article to read. When providing the request for the article, the web browser 118 may provide to the web server 120 both ABCD.com/XYZ+newspaper and XYZ+newspaper.com as referrer URLs 146 in the HTTP referrer 144. When providing the request for the homepage of the newspaper, the web browser 118 may provide to the web server only ABCD.com/XYZ+newspaper as the referrer URL 146 in the HTTP referrer 144.

The referrer URLs 146.1-$n$ may also include a redirect URL. For example, if a first article at a first URL is replaced with a second article at a second URL. The referrer URLs 146.1-*n* may include an indication that the user attempted to access the first URL but was redirected to the second URL.

As set forth in the above example, a specific referrer URL 146.*k* may include an indication of a specific search engine or a specific search query. An identifier for the search engine and an identifier for the search query may be embedded in the specific referrer URL 146.*k*. In other examples, the specific referrer URL 146.*k* may include indications of a user identifier e.g., "FirstSocialNework.com/JohnQSample," a geographic location from which the specific referrer URL was accessed, e.g., "EFGH.com/California," or a time of day when the URL was accessed, e.g., "EFGH.com/9-35-am." The web server 120 may then modify the webpage output for the requested URL 142 based on the user identifier, the geographic location, the time of day, or public information about the user stored within the social network and accessible based on the user identifier in the social network.

The specific referrer URL 146.*k* may also include an indication of a user's activity within a webpage service. For example, depending on the implementation of the First Social Newtork service, the specific referrer URL 146.*k* "FirstSocialNework.com/JKL-supermarket" may indicate that the user viewed the page of JKL Supermarket in First Social Network.

The specific referrer URL 146.*k* may also indicate a natural host language in which the user was interacting with the webpage of the specific referrer URL 146.*k*. For example the specific referrer URL "ABCD.com/HL=EN" indicates that the user was interacting with ABCD.com in the English host language.

The user of the client computing device 110 may opt-out of having the web browser 118 provide the HTTP referrer 144 in conjunction with the HTTP request 140. In some example aspects, the user may need to affirmatively indicate that he/she provides permission for the web browser 118 to store the HTTP referrer 144 and to provide the HTTP referrer 144 to the web server 120. The user may opt-out or affirmatively indicate that he/she provides permission by adjusting settings on the web browser 118.

As further illustrated in FIG. 1, the web browser 118 receives, from the web server 120, a webpage data stream 150. The web browser 118 may generate a display for a webpage based on the webpage data stream 150.

As shown in FIG. 1, the web server 120 includes a processor 122, a network interface 124, and a memory 126. The processor 122 is configured to execute computer instructions that are stored in a computer-readable medium, for example, the memory 126. The processor 122 may be a central processing unit (CPU). While only one processor 122 is illustrated, the server 120 may include multiple processors. Furthermore, while the web server 120 is illustrated as a single machine, the web server 120 may include multiple machines, e.g., within a server farm. The network interface 124 is configured to allow the web server 120 to transmit and receive data in a network, e.g., network 130 of FIG. 1. The network interface 124 may include one or more network interface cards (NICs). The memory 126 stores data or instructions. The memory 126 may be one or more of a cache unit, a storage unit, an internal memory unit, or an external memory unit. As illustrated, the memory 126 includes a webpage data stream generator module 128.

The webpage data stream generator module 128 is configured to receive, from the client computing device 110, the HTTP request 140 including the requested URL 142 and the HTTP referrer 144. The HTTP referrer 144 includes one or more referrer URLs 146.1-*n*. The webpage data stream generator module 128 is also configured to modify a webpage data steam 150 for a webpage associated with the requested URL 142 based on data within the HTTP referrer 144, for example, all or a portion of the one or more referrer URLs 146.1-*n*. The webpage data stream generator module 128 is also configured to provide, to the client computing device 110, the modified webpage data stream 150 for the webpage associated with the requested URL 142. The modified webpage data stream 150 is for generating a display corresponding to the webpage associated with the requested URL 142 on the client computing device 110 via the operation of the web browser 118.

In some examples, the HTTP request 140 may include one or more cookies in addition to or in place of the HTTP referrer 144. In some examples, the HTTP request 140 includes one or more cookies, and the web server 120 is configured to determine the one or more referrer URLs 146.1-*n* based on the one or more cookies. The one or more cookies may include information about the browsing history of the user of the client computing device 110. The browsing history may include a single session browsing history or a browsing history spanning multiple sessions. As used herein, the term "session" may include or refer to a representation of a user's activity on a web browser from a time the web browser is opened until a time the web browser is closed. The one or more cookies may also include account information for a user of the client computing device 110. For example, the user may have account information with one or more of an online store, a social network, an electronic messaging account, etc. The one or more cookies may include data representing the user's activity in association with the user's accounts. However, in some implementations, the user of the client computing device 110 may opt-out of having cookies stored on the client computing device 110 or transmitted to the web server 120. In some implementations, the user may affirmatively indicate that he/she provides permission for cookies to be stored on the client computing device 110 or transmitted to the web server 120. In some implementations, the user may opt-out or affirmatively indicate that he/she provides permission by adjusting settings on the web browser 118.

The web server 120 may also receive from the client computing device 110 additional information about the user and the web browser 118 on the client computing device 110. The additional information may include any information that can be transmitted between the client computing device 110 and the server 120 according to the common gateway interface (CGI), i.e., any CGI parameters that are understood by both the web browser 118 of the client computing device and the web server 120. For example, if the referrer URL 146.*k* corresponds to a webpage that includes an embedded video, a CGI parameter may indicate whether the user played the embedded video at the referrer URL 146.*k* or clicked the hyperlink to the requested URL 142 without playing the embedded video. The webpage data stream 150 may be modified by the webpage data stream generator module 128 on the web server 120 based on the additional information. However, the user may need to give affirmative permission for the web browser 118 to store or for the web server 120 to receive additional information or the user may opt-out of having the web browser 118 provide the additional information to the web server 120.

In other examples, the HTTP request 140 may include no cookies, for example, in response to a request by the user of the client computing device 110 not to store cookies or not to share cookies with the web server 120.

Figure 2:
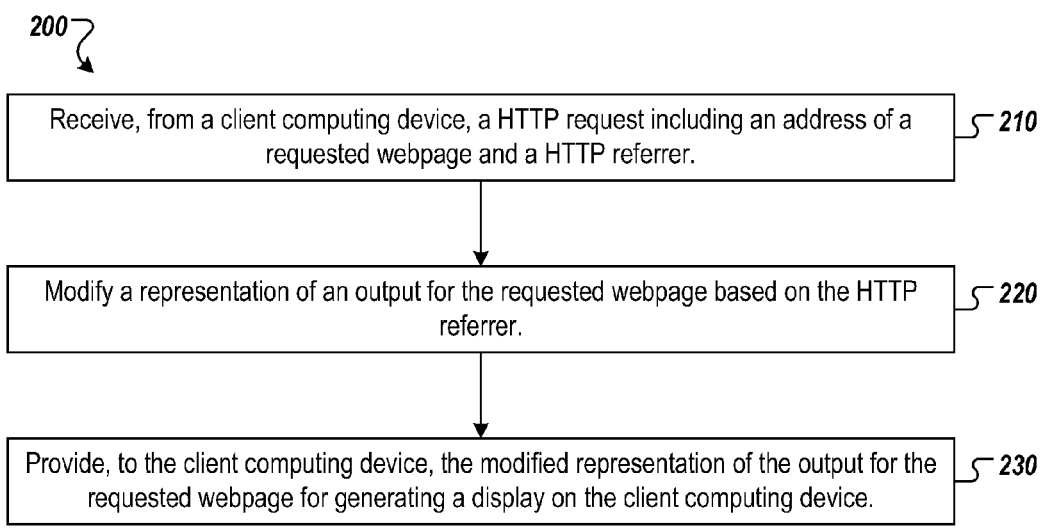
FIG. 2 illustrates an example process by which a webpage display may be modified based on a referrer web address.

FIG. 2 illustrates an example process 200 by which a webpage display may be modified based on a referrer web address.

The process 200 begins at step 210, where a web server (e.g., web server 120) receives, from a client computing device (e.g., client computing device 110) an HTTP request indicating an address of a requested webpage and an HTTP referrer. The HTTP request may be a request for a webpage. The HTTP referrer may include only a single referrer web address or multiple referrer web addresses. Each of the referrer web addresses may be represented as a referrer URL. The referrer web address(es) may identify webpage(s) previously displayed on the client computing device. In some examples, a cookie that includes a referrer URL may be used in place of the HTTP referrer.

In some examples, the HTTP referrer, or another data structure used in place of the HTTP referrer (e.g., a cookie that includes a referrer URL or a URL visited by a computing device associated with the cookie), may identify one or more referrer sources. The one or more referrer sources may include one or more referrer web addresses represented by referrer URLs, as set forth above. The one or more referrer sources may include an electronic message (e.g., an email message or a mobile phone text message). The electronic message may be displayed via the web browser or via an electronic messaging application different from the web browser (e.g., an email or text messaging application). The one or more referrer sources may include other applications different from the web browser, for example, a word processing application, a spreadsheet application, or an instant messaging application executing on a laptop or desktop computer.

In step 220, the web server modifies a representation of an output for the requested webpage, e.g., a webpage data stream for the requested webpage, based on the HTTP referrer. The modification may be based on the referrer URL(s) or the referrer source(s) in the HTTP referrer.

For example, the requested webpage may include multiple comments. Modifying the representation of the output for the webpage may involve arranging at least a subset of the multiple comments according to an order based on the one or more referrer sources or referrer web addresses. The order may be based on one or more second web addresses for one or more second users who previously interacted with the multiple comments. Alternatively, one or more comments with which a second user interacted may be given a distinct visual treatment (e.g., written in bold text or highlighted) to draw the user's attention to these comments. A second user may interact with a comment if he/she writes, prefers (e.g., indicates a preference via a social network), or views the comment. The web server may detect if a second user views a comment based on the second user scrolling within a web browser window or pausing scrolling within a web browser window or by having the web browser on the second user's client computing device pass a common gateway interface (CGI) parameter representing the scrolling action of the second user to the web server. The second user may opt-out of having the web server detect whether he/she views content on a webpage or scrolls through the webpage or the second user may affirmatively provide permission to the web server to detect whether he/she views content on the webpage or scrolls through the webpage.

In some examples, comments posted by users who came to the requested webpage from the same referrer URL as the current user may be placed closer to the top of the set of comments in the requested webpage. In some examples, comments posted by users who came to the requested webpage from the same domain or the same host (e.g., one of the articles in ABC-newspaper.com or one of the articles in DEF-blog.com) as the current user may be placed closer to the top of the set of comments in the requested webpage. In some examples, comments posted by users who came from related URLs (e.g., one of multiple blogs, one of multiple social networks, one of multiple newspapers, etc.) may be placed closer to the top of the set of comments in the requested webpage. In some examples, if the referrer URL is a URL of a social network, comments posted by other users of the social network may be placed closer to the top of the set of comments in the requested webpage. In some examples, if the referrer URL is from a search engine or includes a search term, the web server may determine the search term based on the referrer URL. Comments related to the search term may be placed closer to the top of the set of comments in the requested webpage.

In example implementations, users may link to a specific article either from a social network or from an academic network. The article may include multiple comments (e.g., hundreds or thousands of comments) from users who linked to the article from the social network and users who linked to the article from the academic network. The comments may be stored in conjunction with information about their authors (e.g., in conjunction with account information of the authors, if available, or in conjunction with information about referrer URLs that the authors used to reach the article). When a specific user links to the article from the academic network, comments by other users who linked to the article from the academic network may be ranked higher and placed closer to the top of the webpage than comments by other users who linked to the article from the social network, as the academic user may be more interested in comments by other academics than in comments by social users. As a result, the academic user may be presented with comments that are more relevant or more interesting to the academic user.

The subject technology is described above in conjunction with ranking or marking comments associated with an article. However, in other examples, ratings (e.g., of a movie) or reviews (e.g., of a restaurant) may be ranked or marked using approaches similar to those described above for comments. For example, users who link to a movie reviewing service from a social network may be interested in different reviews than users who link to a movie reviewing service from a website of a movie theater. Similarly, user who link to an online restaurant reviewing service from a newspaper article may be interested in different reviews than user who link to the restaurant reviewing service from an online mapping service.

Modifying the representation of the output for the webpage may also include determining an advertisement to present within the webpage based on the one or more referrer sources. For example, if a user links to a social network from a webpage of a musician, the social network may present advertisements, to the user, for tickets to a concert by the musician or downloads of the musician's recordings for purchase.

Modifying the representation of the output for the webpage may also include providing a display element based on the one or more referrer web addresses or referrer sources. For example, if a user links to a webpage of an online store from his/her feed in a social network called "First Social Network," the online store may receive the referrer URL of the user's feed. The online store may then determine additional information about the user from the social network (e.g., the user's name, email address, and city of residence, if the user chooses to make this information public in the social network). The online store may then pre-populate input boxes associated with checking out from the online store based on the information provided by the user. Alternatively, the online store may provide text saying, "You visited this page after visiting First Social Network," for display in conjunction with an image associated with First Social Network.

Alternatively, if the user links to "First Social Network" from "Second Online Store," First Social Network may receive a referrer URL 146.1-n indicating Second Online Store. In response, First Social Network may pre-populate a post by the user about Second Online Store. The user may edit or modify the post before publishing the post to First Social Network, or the user may delete the post or refuse to publish the post to First Social Network.

In some implementations, the HTTP request may not include any cookies. Alternatively, the HTTP request may include one or more cookies in addition to or in place of the one or more referrer URLs. The cookie(s) may include a browsing history of the user during a single session or multiple sessions on a single computing device or on multiple computing devices associated with the user. The multiple computing devices may be associated with the user based on an account (e.g., an email account, a social networking account, or an account in an online store) accessed by the user from the multiple computing devices. As used herein, the term "session" may include or refer to a representation of a user's activity on a web browser from a time the web browser is opened until a time the web browser is closed. The web server may modify the representation of the output for the requested webpage based on information within the cookie (s), for example the browsing history of the user.

For example, the web server may create a browsing profile for the user (e.g., the user browses 50% news websites, 40% economics websites, and 10% other websites). The web server may modify the output of the webpage based on the browsing profile. Based on the example browsing profile above, the user may be provided with comments on newspaper articles by other users who linked to the article from economics blogs or advertisements for economics journals.

In step 230, the web server provides, to the client computing device, the modified representation of the output for the webpage, e.g., the modified webpage data stream for the requested webpage, for generating a display on the client computing device. The client computing device may generate the display for the requested webpage via operation of the web browser. After step 230, the process 200 ends.

The subject technology is described above in conjunction with the HTTP protocol and web addresses being represented as URL. However, in some aspects, the subject technology may be implemented in conjunction with protocols other than HTTP and web addresses being represented using representations other than URLs. For example, referrer sources other than URLs or webpages (e.g., local applications other than the web browser) may be represented via a referrer data structure other than an HTTP referrer.

Figure 3:
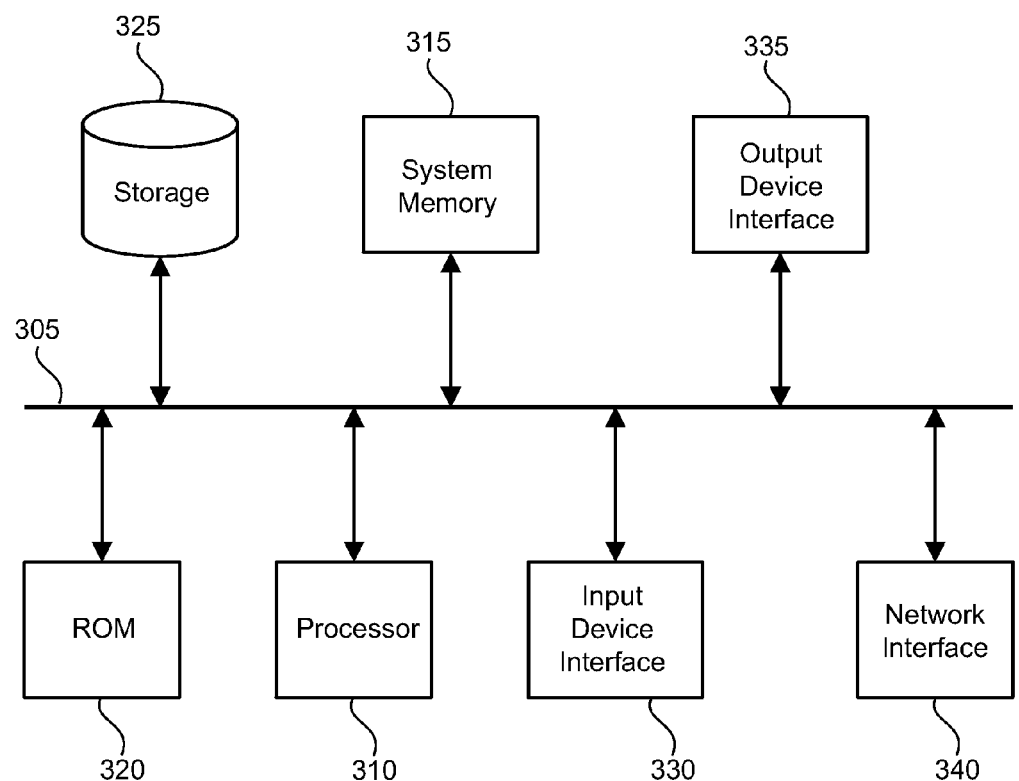
FIG. 3 conceptually illustrates an example electronic system with which some implementations of the subject technology are implemented.

FIG. 3 conceptually illustrates an electronic system 300 with which some implementations of the subject technology are implemented. For example, one or more of the web server 120, or the client computing device 110 may be implemented using the arrangement of the electronic system 300. The electronic system 300 can be a computer (e.g., a mobile phone, PDA), or any other sort of electronic device. Such an electronic system includes various types of computer readable media and interfaces for various other types of computer readable media. Electronic system 300 includes a bus 305, processing unit(s) 310, a system memory 315, a read-only memory 320, a permanent storage device 325, an input device interface 330, an output device interface 335, and a network interface 340.

The bus 305 collectively represents all system, peripheral, and chipset buses that communicatively connect the numerous internal devices of the electronic system 300. For instance, the bus 305 communicatively connects the processing unit(s) 310 with the read-only memory 320, the system memory 315, and the permanent storage device 325.

From these various memory units, the processing unit(s) 310 retrieves instructions to execute and data to process in order to execute the processes of the subject technology. The processing unit(s) can be a single processor or a multi-core processor in different implementations.

The read-only-memory (ROM) 320 stores static data and instructions that are needed by the processing unit(s) 310 and other modules of the electronic system. The permanent storage device 325, on the other hand, is a read-and-write memory device. This device is a non-volatile memory unit that stores instructions and data even when the electronic system 300 is off. Some implementations of the subject technology use a mass-storage device (for example a magnetic or optical disk and its corresponding disk drive) as the permanent storage device 325.

Other implementations use a removable storage device (for example a floppy disk, flash drive, and its corresponding disk drive) as the permanent storage device 325. Like the permanent storage device 325, the system memory 315 is a read-and-write memory device. However, unlike storage device 325, the system memory 315 is a volatile read-and-write memory, such a random access memory. The system memory 315 stores some of the instructions and data that the processor needs at runtime. In some implementations, the processes of the subject technology are stored in the system memory 315, the permanent storage device 325, or the read-only memory 320. For example, the various memory units include instructions for modifying a webpage display based on a referrer web address in accordance with some implementations. From these various memory units, the processing unit(s) 310 retrieves instructions to execute and data to process in order to execute the processes of some implementations.

The bus 305 also connects to the input and output device interfaces 330 and 335. The input device interface 330 enables the user to communicate information and select commands to the electronic system. Input devices used with input device interface 330 include, for example, alphanumeric keyboards and pointing devices (also called "cursor control devices"). Output device interfaces 335 enables, for example, the display of images generated by the electronic system 300. Output devices used with output device interface 335 include, for example, printers and display devices, for example cathode ray tubes (CRT) or liquid crystal displays (LCD). Some implementations include devices for example a touchscreen that functions as both input and output devices.

Finally, as shown in FIG. 3, bus 305 also couples electronic system 300 to a network (not shown) through a network interface 340. In this manner, the electronic system 300 can be a part of a network of computers (for example a local area network ("LAN"), a wide area network ("WAN"), or an Intranet, or a network of networks, for example the Internet. Any or all components of electronic system 300 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method, the method comprising:
   receiving a request for a webpage, wherein the request comprises one or more referrer web addresses, and wherein the webpage comprises a plurality of user-generated comments;
   modifying a representation of an output for the webpage based on the one or more referrer web addresses, wherein modifying the representation of the output for the webpage comprises arranging at least a subset of the plurality of user-generated comments according to an order based on the one or more referrer web addresses; and
   providing the modified representation of the output for the webpage for generating a display on a client computing device.

2. The method of claim 1, wherein the order is further based on one or more second referrer web addresses for one or more users who previously interacted with the plurality of user-generated comments.

3. The method of claim 1, wherein modifying the representation of the output for the webpage further comprises determining an advertisement to present within the webpage based on the one or more referrer web addresses.

4. The method of claim 1, wherein modifying the representation of the output for the webpage further comprises providing a display element, based on the one or more referrer web addresses, within the modified representation of the output for the webpage.

5. The method of claim 1, wherein the one or more referrer web addresses comprise only a single referrer web address.

6. The method of claim 1, wherein the one or more referrer web addresses comprise a plurality of referrer web addresses.

7. The method of claim 1, wherein the request comprises at least one cookie, the method further comprising:
   determining the one or more referrer web addresses based on the at least one cookie.

8. The method of claim 1, wherein the request comprises no cookies.

9. The method of claim 1, wherein the plurality of user-generated comments comprises comments posted by one or more second users referred to the webpage from the one or more referrer web addresses, and wherein arranging at least the subset of the plurality of user-generated comments according to the order comprises prioritizing the comments posted by the one or more second users.

10. A computer-readable medium comprising instructions which, when executed by one or more computers, cause the one or more computers to:
    receive a request for a webpage, wherein the request is associated with one or more referrer sources, and wherein the webpage comprises a plurality of user-generated comments;
    modify a representation of an output for the webpage based on the one or more referrer sources by arranging at least a subset of the plurality of user-generated comments according to an order based on the one or more referrer sources; and
    provide the modified representation of the output for the webpage, for generating a display on a client computing device.

11. The computer-readable medium of claim 10, wherein the one or more referrer sources comprise an electronic message.

12. The computer-readable medium of claim 10, wherein the one or more referrer sources comprise an application different from a web browser.

13. The computer-readable medium of claim 10, wherein the one or more referrer sources comprise one or more referrer web addresses.

14. The computer-readable medium of claim 10, wherein the order is further based on one or more second referrer sources for one or more users who previously interacted with the plurality of user-generated comments.

15. The computer-readable medium of claim 10, wherein the instructions to modify the representation of the output for the webpage comprise instructions which, when executed by the one or more computers, cause the one or more computers to:
    determine an advertisement to present within the webpage based on the one or more referrer sources.

16. The computer-readable medium of claim 10, wherein the instructions to modify the representation of the output for the webpage comprise instructions which, when executed by the one or more computers, cause the one or more computers to:
    provide a display element, based on the one or more referrer sources, within the modified representation of the output for the webpage.

17. The computer-readable medium of claim 10, wherein the one or more referrer sources comprise only a single referrer source.

18. The computer-readable medium of claim 10, wherein the request comprises at least one cookie, the computer-readable medium further comprising instructions which, when executed by the one or more computers, cause the one or more computers to:
  determine the one or more referrer web addresses based on the at least one cookie.

19. A system comprising:
  one or more processors;
  a memory comprising instructions which, when executed by the one or more processors, cause the one or more processors to:
    receive, from a client computing device, a hypertext transfer protocol (HTTP) request comprising an address of a requested webpage and an HTTP referrer, wherein the requested webpage comprises a plurality of user-generated comments;
    modify a representation of an output for the requested webpage based on the HTTP referrer by arranging at least a subset of the plurality of user-generated comments according to an order based on the HTTP referrer; and
    provide, to the client computing device, the modified representation of the output for the requested webpage for generating a display on the client computing device.

20. The system of claim 19, wherein the HTTP referrer identifies one or more webpages previously displayed on the client computing device.

* * * * *